United States Patent
Sakaguchi et al.

(10) Patent No.: US 7,992,606 B2
(45) Date of Patent: Aug. 9, 2011

(54) HEAVY LOAD PNEUMATIC TIRE

(75) Inventors: Taisuke Sakaguchi, Hiratsuka (JP); Hiroshi Ilzuka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/622,792

(22) Filed: Nov. 20, 2009

(65) Prior Publication Data
US 2010/0122759 A1 May 20, 2010

(30) Foreign Application Priority Data

Nov. 20, 2008 (JP) ................................. 2008-296742

(51) Int. Cl.
*B60C 11/04* (2006.01)

(52) U.S. Cl. ......... 152/209.16; 152/209.23; 152/209.27; 152/901

(58) Field of Classification Search ............. 152/209.16, 152/209.23, 209.27, 901
See application file for complete search history.

(56) References Cited

U.S. PATENT DOCUMENTS

| | | | | |
|---|---|---|---|---|
| 5,843,249 A | * | 12/1998 | Ryba et al. | 152/209.1 |
| 6,488,064 B1 | | 12/2002 | Radulescu | |

FOREIGN PATENT DOCUMENTS

| | | | |
|---|---|---|---|
| GB | 2 170 153 A | | 7/1986 |
| JP | 63-134313 | * | 6/1988 |
| JP | S63-134313 A | | 6/1988 |
| JP | 02-077306 | * | 3/1990 |
| JP | 03-007604 | * | 1/1991 |
| JP | H3-7603 A | | 1/1991 |
| JP | 05-169920 | * | 7/1993 |
| JP | H5-185809 A | | 7/1993 |
| JP | 2002-079809 A | | 3/2002 |

OTHER PUBLICATIONS

Machine translation for Japan 05-169920 (no date).*

* cited by examiner

*Primary Examiner* — Steven D Maki
(74) *Attorney, Agent, or Firm* — Thorpe North & Western LLP

(57) ABSTRACT

The offset amount that a sacrificial rib road contact surface is recessed to the inner side of a tire with regards to a shoulder rib road contact surface is equal to 0, and a circumferential fine groove is provided such that the opening side thereof is located on the inner side when the tire is filled to a proper internal pressure. The dimension Ws in the tire width direction of the shoulder rib road contact surface and the dimension Wa in the tire width direction of the sacrificial rib road contact surface are set such that $0.10 \leq Wa/Ws \leq 0.2$. The dimension Wb in the tire width direction of the sacrificial rib road contact surface when the groove depth of the circumferential main grooves has worn 20% is set in a range such that $0.25 \leq Wb/Ws \leq 0.30$.

16 Claims, 5 Drawing Sheets

| | Conventional Embodiment 1 | Comparative Embodiment 1 | Comparative Embodiment 2 | Embodiment 1 | Embodiment 2 | Embodiment 3 | Embodiment 4 | Embodiment 5 | Embodiment 6 |
|---|---|---|---|---|---|---|---|---|---|
| Amount of offset of sacrifice rib (H) (mm) | 2 | 0 | 0 | 0 | 0 | 0 | 0 | 0 | 0 |
| Angle of circumferential fine groove (facing opening side) | Outward direction | Outward direction | Inward direction | Inward direction | Inward direction | Inward direction | Inward direction | Inward direction | Inward direction |
| Sacrifice rib width: when new tire (Wa/Ws) | 0 | 0.08 | 0.4 | 0.15 | 0.15 | 0.15 | 0.15 | 0.15 | 0.15 |
| Sacrifice rib width: at 20% wear (Wb/Ws) | 0.17 | 0.17 | 0.72 | 0.27 | 0.27 | 0.27 | 0.27 | 0.27 | 0.27 |
| Sacrifice rib width: at 40% wear (Wc/Ws) | 0.25 | 0.25 | 0.85 | 0.32 | 0.32 | 0.32 | 0.32 | 0.32 | 0.32 |
| Groove depth of circumferential fine groove (Db/Da) | 1 | 1 | 0.7 | 0.7 | 0.9 | 0.7 | 0.7 | 0.7 | 0.7 |
| Groove width of circumferential fine groove (Wb)(mm) | 2.3 | 2.3 | 2.3 | 2.3 | 1.5 | 2.3 | 2.3 | 2.3 | 2.3 |
| TWs/(TW/2) | 0.35 | 0.35 | 0.35 | 0.35 | 0.35 | 0.4 | 0.4 | 0.4 | 0.4 |
| TWs/TWc | 1 | 1 | 1 | 1 | 1 | 1 | 1.05 | 1.05 | 1.05 |
| TWs/TWh | 1 | 1 | 1 | 1 | 1 | 1 | 1.05 | 1.05 | 1.05 |
| GW/TW | 0.25 | 0.25 | 0.25 | 0.25 | 0.25 | 0.2 | 0.18 | 0.18 | 0.18 |
| TWs/Db | 1.8 | 1.8 | 1.8 | 1.8 | 1.8 | 1.8 | 1.8 | 2.2 | 2.2 |
| Rubber hardness of rib on the outermost side in the tire width direction | 60 | 60 | 60 | 60 | 60 | 60 | 60 | 60 | 65 |
| Uneven wear resistance | 100 | 100 | 80 | 120 | 120 | 130 | 140 | 150 | 170 |

FIG. 5

HEAVY LOAD PNEUMATIC TIRE

PRIORITY CLAIM

Priority is claimed to Japan Patent Application Serial No. JP2008-296742 filed on Nov. 20, 2008, which is incorporated herein by reference in its entirety.

TECHNICAL FIELD

The present invention relates to a pneumatic tire for heavy load, and more specifically, to a pneumatic tire for heavy load that has an abrasion sacrifice rib that is formed in order to prevent uneven wear of the shoulder region of the tread.

BACKGROUND ART

With pneumatic tires for heavy loads, uneven wear (such as step wearing) occurs in the shoulder region of the tread under conditions of use such as when the steering shaft is mainly turned while driving continuously at high speeds for a long period of time. Conventional pneumatic tires have sought to solve this problem by providing a circumferential fine groove that extends in the circumferential direction of the tire formed in the shoulder region of the tread for the purpose of preventing uneven wearing of the shoulder region of the tread. A rib that extends in the tire circumferential direction is formed on the outer side in the tire width direction by the circumferential fine groove. Furthermore, when the tire is in contact with the ground, this rib minimizes uneven wear in the shoulder region of the tread by proactively wearing as an abrasion sacrifice rib (for example, refer to Japanese Examined Patent No. H06-004364 and Japanese Patent No. 3902240).

Specifically, the pneumatic tire for heavy load shown in Japanese Examined Patent No. H06-004364 has a shoulder rib that is divided into an outer rib (sacrifice rib) and an inner rib by a single auxiliary groove. The auxiliary groove is set at an interval corresponding to between 25 and 40% of the width of the shoulder rib as measured from the end edge of the tread. Furthermore, the auxiliary groove is set to be angled toward the outside at an angle of 20 degrees or less with regards to the normal line of the tread surface.

Furthermore, the pneumatic tire for heavy load according to Japanese Patent No. 3902240 has a sacrifice rib surface that is offset and recessed to the inner side in the tire radial direction from the profile line in the tire width direction of the shoulder rib, and the amount of offset is between 0.5 and 2.0 mm for a new tire.

However, with the pneumatic tire for heavy load shown in Japanese Examined Patent No. H06-004364, the ratio of the width of the sacrifice rib to the width of the inner rib of a new tire will gradually increase when the new tire becomes worn and will exceed the specified level of between 25 and 40%, based on the location of the auxiliary rib on the shoulder rib and the angle thereof. Therefore, there is a concern that rigidity of the shoulder rib will drop when the new tire becomes worn, resulting in deterioration of uneven wear resistance.

Furthermore, with the pneumatic tire for heavy load shown in Japanese Patent No. 3902240, the surface of the sacrifice rib is formed to be offset and recessed to the inner side in the tire radial direction from the profile line in the tire width direction of the shoulder rib. Since a drop in road contact pressure at the outside edge part in the tire width direction of the shoulder rib is thus induced at the early stages of wearing, there is a concern that uneven wear will be accelerated.

In light of the foregoing, an object of the present invention is to provide a pneumatic tire for heavy load that can increase resistance to uneven wear.

SUMMARY OF THE INVENTION

In order to achieve the aforementioned objective, the pneumatic tire for heavy load of the present invention includes at least three ribs that extend in a circumferential direction of the tire by means of at least two circumferential main grooves that extend in the circumferential direction of the tire, the ribs being formed in a tread. The tire is further provided with a circumferential fine groove that extends in the circumferential direction of the tire and opens to a road contact surface of the tread, the groove being formed in the rib on an outermost side in the tire width direction among the ribs. Additionally, a shoulder rib is formed on an inner side in the tire width direction of the rib on the outermost side in the tire width direction and a sacrifice rib is formed on the outer side in the tire width direction of the rib on the outermost side in the tire width direction. In the tire of the present invention, a road contact surface of the sacrifice rib has an offset amount H of recess to the inside in the radial direction of the tire with regards to a road contact surface of the shoulder rib that is set within a range such that $0 \text{ mm} \leq H \leq 0.5 \text{ mm}$. The circumferential fine groove of the tire is angled such that an opening side thereof is located on the inner side in the tire width direction when the tire is filled to the proper internal pressure. Additionally, a dimension Wa in the tire width direction of the road contact surface of the sacrifice rib of a new tire is set with regards to a dimension Ws in the tire width direction of the road contact surface of the shoulder rib of a new tire such that $0.10 \leq Wa/Ws \leq 0.20$, and a dimension Wb in the tire width direction of the road contact surface of the sacrifice rib when the groove depth of the circumferential main grooves has worn 20% with regards to the dimension Ws in the tire width direction of the road contact surface of the shoulder rib is set in a range such that $0.25 \leq Wb/Ws \leq 0.30$. Further, a dimension Wc in the tire width direction of the road contact surface of the sacrifice rib when a groove depth of the circumferential main grooves has worn 40% with regards to the dimension Ws in the tire width direction of the road contact surface of the shoulder rib is set in a range such that $0.30 \leq Wc/Ws \leq 0.35$.

With this pneumatic tire for heavy load, by specifying the amount of offset H of the road contact surface of the sacrifice rib with regards to the road contact surface of the shoulder rib, since the road contact pressure of the sacrifice rib is increased and the amount of slipping at the outside edge part in the tire width direction of the tread is reduced, the occurrence of uneven wear of the shoulder rib can be suppressed during the early stages of wear. Also, when the tire is filled to a proper internal pressure, the circumferential fine groove is angled such that the opening side thereof is located on the inner side in the tire width direction. Furthermore, since the dimension Wa in the tire width direction of the road contact surface of the sacrifice rib of a new tire, the dimension Wb in the tire width direction of the road contact surface of the sacrifice rib when the groove depth of the circumferential main groove has worn 20%, and the dimension Wc in the tire width direction of the road contact surface of the sacrifice rib when the groove depth of the circumferential main groove has worn 40% are specified with regards to the dimension Ws in the tire width direction of the road contact surface of the shoulder rib of a new tire, the rigidity of the shoulder rib is increased during wear from a new tire. As a result, uneven wearing of the shoulder rib can be suppressed Also, with the pneumatic tire for heavy load according to the present invention, the groove depth Db of the circumferential fine groove is set with regards to the groove depth Da of the circumferential main grooves such that $0.80 \leqq Db/Da \leqq 1.10$, and the groove width Wd of the circumferential fine groove is set within a range such that $0.3 \text{ mm} \leqq Wd \leqq 2.0 \text{ mm}$.

With this pneumatic tire for heavy load, the effect of suppressing uneven wearing of the shoulder rib by the sacrifice rib can be further enhanced.

Furthermore, with the pneumatic tire for heavy load of the present invention, the groove bottom of the circumferential fine groove is formed with an inflection to the inner side in the width direction of the tire.

With this pneumatic tire for heavy load, since the rigidity of the groove bottom of the circumferential fine groove is increased, the occurrence of cracking in the groove bottom of the circumferential fine groove can be prevented.

Furthermore, with the pneumatic tire for heavy load according to the present invention, with regards to the road contact surface of the tread that contacts the road surface when the tire is filled to the proper internal pressure and a proper load is applied, a dimension TW in the tire width direction when the tread is spread open, a dimension TWc in the tire width direction of the road contact surface of a rib at a center in the tire width direction, a dimension TWs in the tire width direction of the road contact surface of the rib on the outermost side in the tire width direction, a dimension TWh in the tire width direction of the road contact surface of the rib between the rib at the center in the tire width direction and the rib on the outermost side in the tire width direction, and a groove width GW of all of the circumferential main grooves satisfy $0.40 \leqq TWs/(TW/2)$, $1.05 \leqq TWs/TWh$, $1.05 \leqq TWs/TWc$, and $0.15 \leqq GW/TW \leqq 0.20$.

With this pneumatic tire for heavy load, the modulus of elasticity in the tire width direction of the entire tread is increased, and the amount of slippage of the shoulder region, which is the outermost side in the tire width direction, is minimized. As a result, uneven wear due to slipping that occurs when lateral forces are generated in the tire width direction can be suppressed Furthermore, with the pneumatic tire for heavy load according to the present invention, the dimension TWs in the tire width direction of the road contact surface of the rib on the outermost side in the tire width direction is set with regards to the groove depth Db of the circumferential main groove that forms the rib on the outermost side in the width direction of the tire such that $2.00 \leqq TWs/Db$.

With this pneumatic tire for heavy load, the modulus of elasticity in the tire width direction of the entire tread is increased, and the amount of slippage is reduced in the shoulder region, which is the outermost side in the tire width direction. As a result, uneven wear due to slipping that occurs when lateral forces are generated in the tire width direction can be suppressed Furthermore, with the pneumatic tire for heavy load according to the present invention, the rubber of at least the rib on the outermost side in the tire width direction has a Japanese Industrial Standards Association (JIS A) hardness of 60 or more.

With this pneumatic tire for heavy load, the modulus of elasticity in the tire width direction of the entire tread is increased, and the amount of slippage is reduced in the shoulder region, which is the outermost side in the tire width direction. As a result, uneven wear due to slipping that occurs when lateral forces are generated in the tire width direction can be suppressed

BRIEF DESCRIPTION OF THE DRAWINGS

FIG. 5 is a table showing the testing results for the performance tests on a pneumatic tire for heavy load according to an embodiment of the present invention.

The pneumatic tire for heavy load according to the present invention suppresses the main causes of uneven wear of the shoulder rib in the early stages of wear, and in addition, the rigidity of the shoulder rib is increased during wear from a new tire, so uneven wearing can be suppressed

DETAILED DESCRIPTION

Embodiments of the pneumatic tire for heavy load according to the present invention are described below in detail based on the drawings. However, the present invention is not limited to these embodiments. Furthermore, the constituents of these embodiments include elements that are essentially identical or that can be easily substituted by one skilled in the art. Furthermore, a plurality of alternate examples that are shown in the embodiments can be arbitrarily combined by one skilled in the art.

Figure 1:
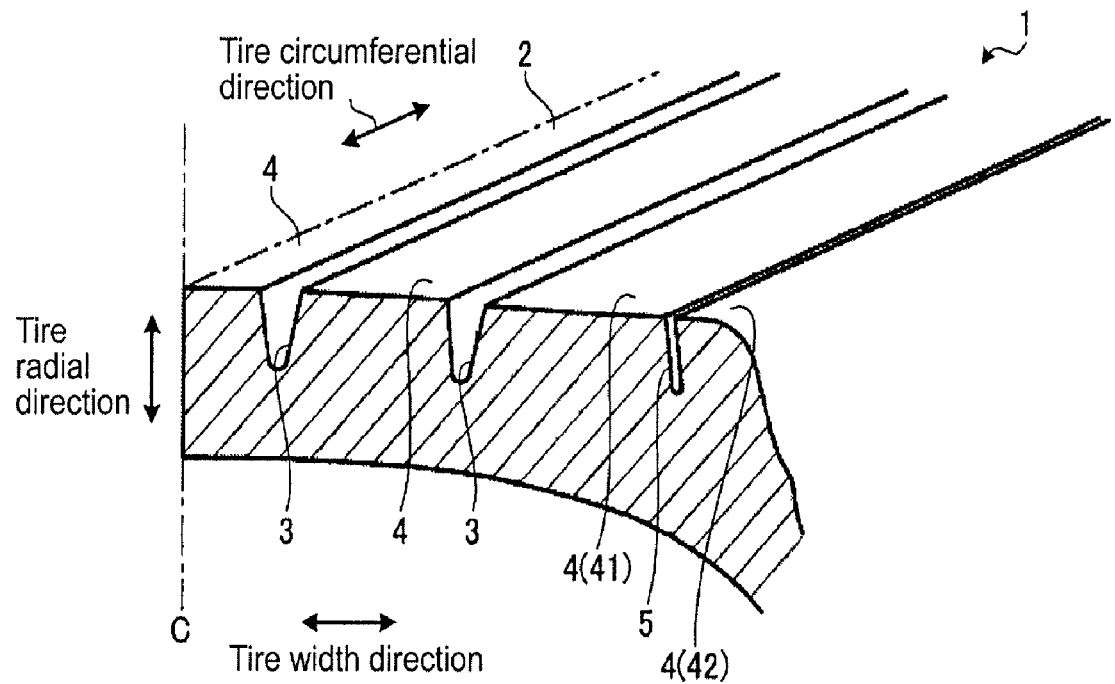
FIG. 1 is a meridian cross-sectional perspective view of a pneumatic tire for heavy load according to an embodiment of the present invention.
Figure 2:
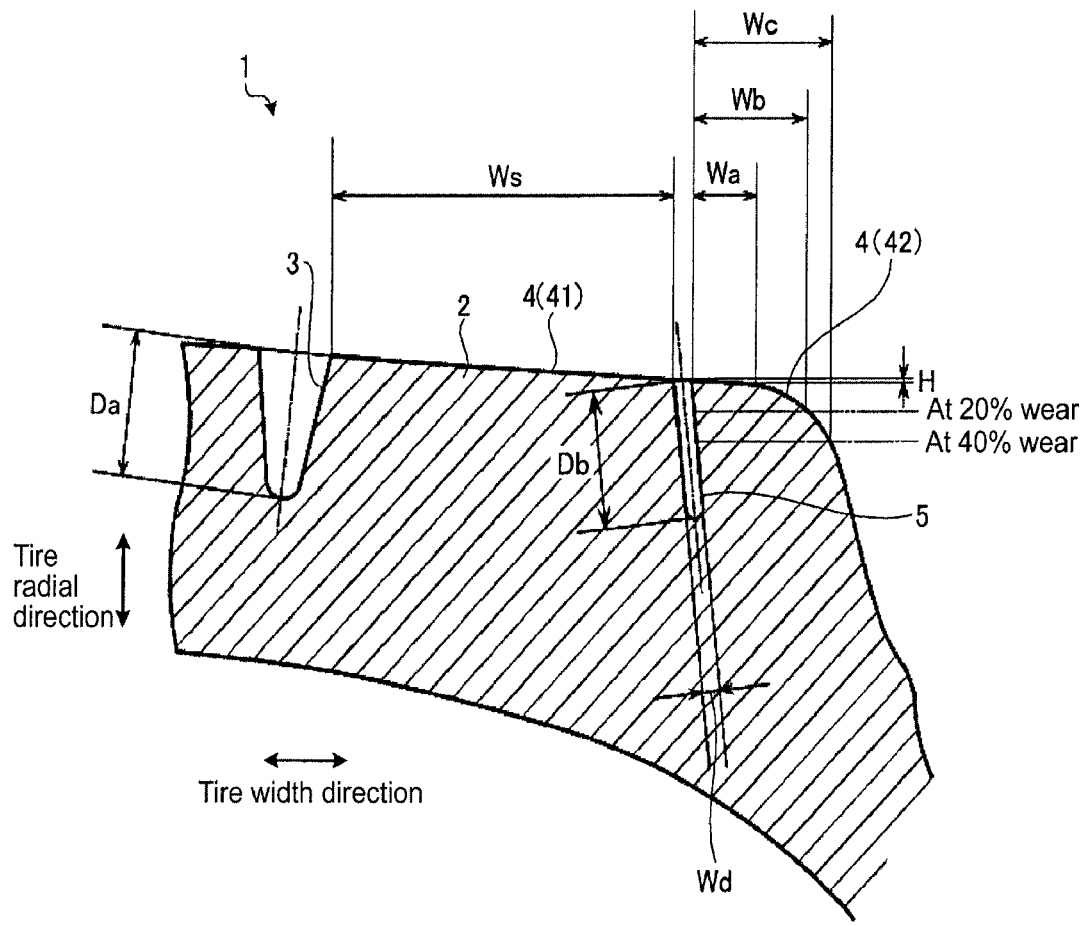
FIG. 2 is an expanded meridian cross-sectional view of the pneumatic tire for heavy load shown in FIG. 1.
Figure 3:
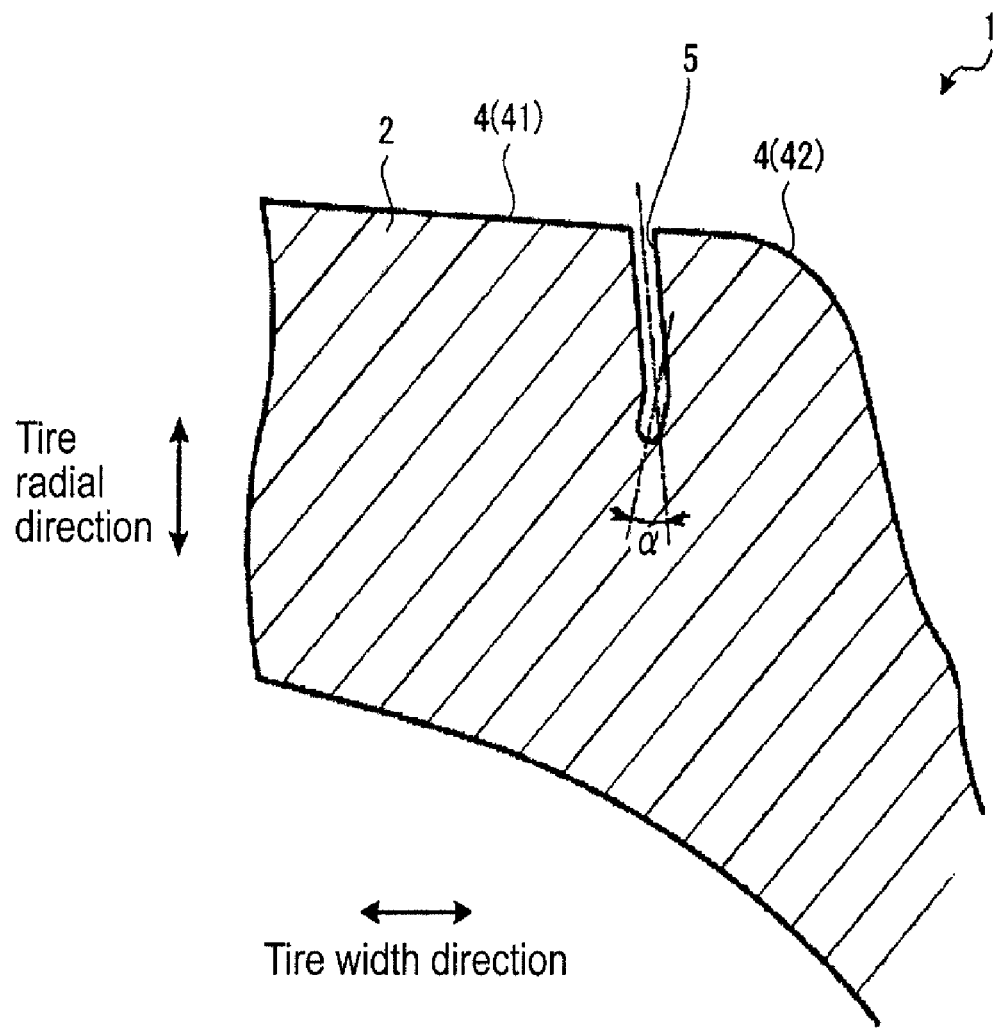
FIG. 3 is a meridian cross-sectional view showing another form of the circumferential fine groove.
Figure 4:
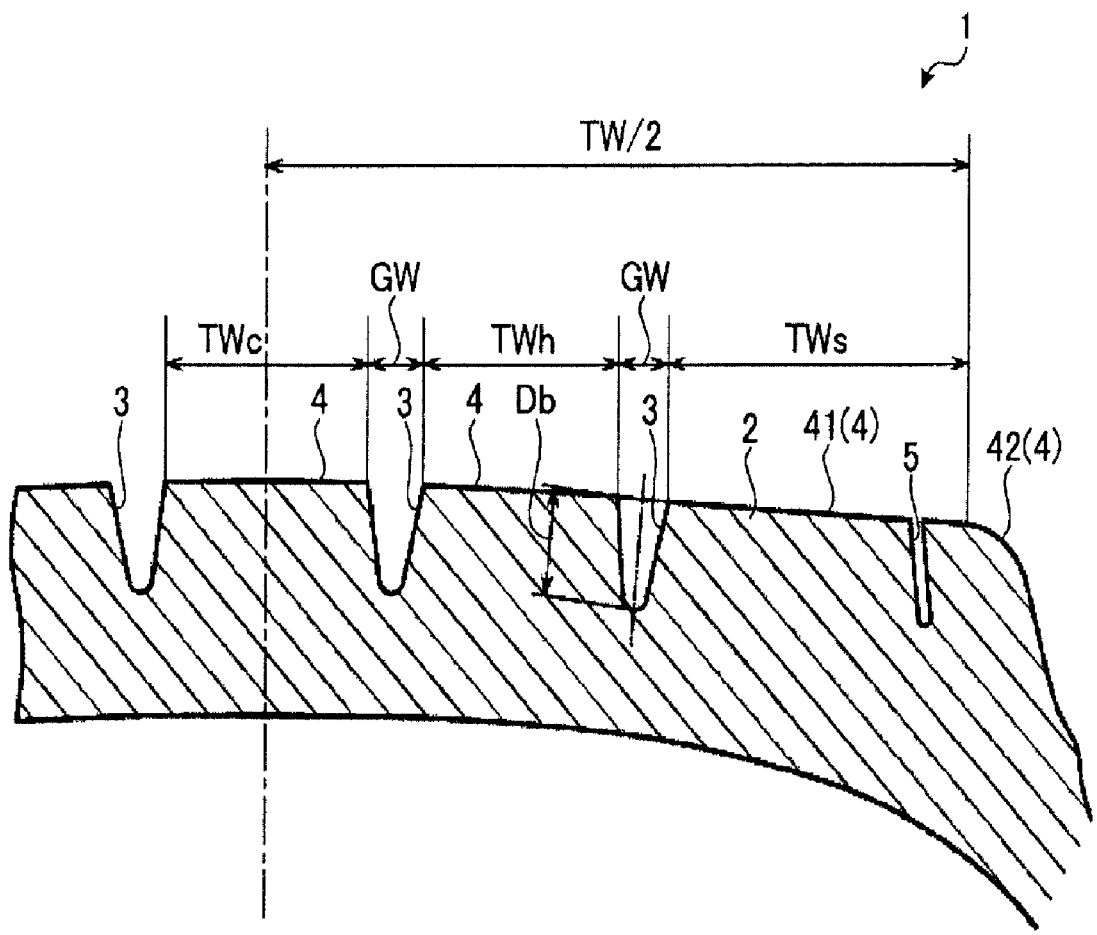
FIG. 4 is a meridian cross-sectional view of a pneumatic tire for heavy load according to an embodiment of the present invention.

FIG. 1 is a meridian cross-sectional perspective view of a pneumatic tire for heavy load according to an embodiment of the present invention, FIG. 2 is a meridian cross-sectional expanded view of the pneumatic tire for heavy load shown in FIG. 1, FIG. 3 is a meridian cross-sectional view showing another form of the circumferential fine groove, and FIG. 4 is a meridian cross-sectional view of a pneumatic tire for heavy load according to an embodiment of the present invention.

In the following description, "tire width direction" refers to the direction parallel to the rotating shaft of a pneumatic tire for heavy load 1; "inner side in the tire width direction" refers to the side that faces a tire equatorial plane C in the tire width direction; and "outer side in the tire width direction" refers to the side distanced from the tire equatorial plane C in the tire width direction. Furthermore, "tire radial direction" refers to the direction orthogonal to the rotating shaft; "inner side in the tire radial direction" refers to the side facing the rotating shaft in the tire radial direction; and "outer side in tire radial direction" refers to the side distanced from the rotating shaft in the tire radial direction. Furthermore, "tire circumferential direction" refers to the circumferential direction with the rotational shaft as the center axis.

Furthermore, the pneumatic tire for heavy load 1 described below is constructed to be essentially symmetric around the tire equatorial plane C. The tire equatorial plane C is the plane that is orthogonal to the rotational shaft of the pneumatic tire for heavy load 1 and that passes through the center of the tire width of the pneumatic tire for heavy load 1.

The tire width is the width in the tire width direction between components located to the outside in the tire width direction, or in other words, the distance between the most distant components from the tire equatorial plane C in the tire width direction. Furthermore, "tire equatorial line" refers to the line in the circumferential direction of the pneumatic tire for heavy load 1 that lies on the tire equatorial plane C. In addition, the pneumatic tire for heavy load 1 described below is constructed to be essentially symmetric around the tire equatorial plane C, and therefore, as illustrated in FIG. 1, in the meridian cross-sectional view where the pneumatic tire for heavy load 1 is cut by a plane that passes through the rotational shaft of the pneumatic tire for heavy load 1, only one side (the right side in FIG. 1) centered on the tire equatorial plane C is illustrated in the drawing, and only this one side is described. A description of the other side (left side in FIG. 1) is omitted.

As illustrated in FIG. 1, the road contact surface of a tread 2 of the pneumatic tire for heavy load 1 has a plurality of circumferential main grooves 3 provided in parallel to the tire width direction and extending in the tire circumferential direction (FIG. 1 illustrates a configuration where four circumferential main grooves 3 are formed in the tread 2) and a plurality of ribs 4 (five in the present embodiment) made from the land parts that are formed in parallel to the tire width direction and separated by the circumferential main grooves 3. Incidentally, having at least two circumferential main grooves 3 is acceptable, and having at least three ribs 4 is acceptable. Furthermore, the road contact surface refers to the surface of the tread 2 (ribs 4) that contacts with the road surface when a vehicle (not shown) to which the pneumatic tire for heavy load 1 is mounted is driven.

This pneumatic tire 1 has, formed in the rib 4 in the shoulder region, which is the outermost side in the tire width direction, a circumferential fine groove 5 that opens to the road contact surface of the tread 2 and that extends in the tire circumferential direction. Furthermore, the rib 4 of the shoulder region is divided by this circumferential fine groove 5 into a shoulder rib 41 on the inner side in the tire width direction of the circumferential fine groove 5 and a sacrifice rib 42 on the outermost side in the tire width direction of the circumferential fine groove 5. The sacrifice rib 42 is located on the outermost side of the shoulder region of the tread 2, and is provided in order to reduce uneven wear (for example step wear) of the shoulder rib 41 on the inner side in the tire width direction by proactively wearing down when the tire is in contact with the ground. Incidentally, the circumferential fine groove 5 and the sacrifice rib 42 are formed in the shoulder region on both sides (left and right) in the tire width direction of the tread 2, or on only the shoulder region on the outside of the vehicle when the pneumatic tire for heavy load 1 is mounted on a vehicle.

For the pneumatic tire for heavy load 1 with the aforementioned construction, the amount of offset H that the road contact surface of the sacrifice rib 42 is recessed to the inner side in the tire radial direction with regards to the road contact surface of the shoulder rib 41 is set within a range such that $0 \text{ mm} \leq H \leq 0.5 \text{ mm}$ is satisfied. Incidentally, the amount of offset H is determined as the difference between the positions in the tire radial direction of the opening edge of the inner side in the tire width direction and of the opening edge of the outer side in the tire width direction of the circumferential fine groove 5.

In other words, since the ground contact pressure of the sacrifice rib 42 will increase and the amount of slippage at the outside edge part in the tire width direction of the tread 2 will be reduced by specifying the amount of offset H of the road contact surface of the sacrifice rib 42 with regards to the road contact surface of the shoulder rib 41, the main causes of uneven wear (such as defects which cause uneven wear) of the shoulder rib 41 can be suppressed in the early stages of wear. When there is a step that exceeds 0.5 mm from the road contact surface of the shoulder rib 41 to the road contact surface of the sacrifice rib 42, since a reduction in the ground contact pressure at the outside edge part in the tire width direction of the tread 2 is induced during the early stages of wear, and furthermore, gaps that allow foreign material to penetrate will occur because of the step, uneven wearing of the shoulder rib 41 is accelerated.

Furthermore, the circumferential fine groove 5 is provided with an angle such that the opening side thereof is located to the inner side in the tire width direction when the pneumatic tire for heavy load 1 is assembled onto a proper rim and is at proper internal pressure fill where filling is to a proper internal pressure. Herein, proper rim includes a "standard rim" defined by the Japan Automobile Tire Manufacturers Association Inc. (JATMA), a "design rim" defined by the Tire and Rim Association, Inc. (TRA), and a "measuring rim" defined by the European Tyre and Rim Technical Organisation (ETRTO). Proper inner pressure refers to the "maximum air pressure" defined by JATMA, the maximum value in "tire load limits at various cold inflation pressures" defined by TRA, and the "inflation pressures" defined by ETRTO.

Specifically, as shown in FIG. 2, the dimension Wa in the tire width direction of the road contact surface of the sacrifice rib 42 of a new tire with regards to the dimension Ws in the tire width direction of the road contact surface of the shoulder rib 41 of a new tire is set within a range such that $0.10 \leq Wa/Ws \leq 0.20$, by the angle and position in the tire width direction of the circumferential fine groove 5. Furthermore, the dimension Wb in the tire width direction of the road contact surface of the sacrifice rib when the groove depth of the circumferential main groove 3 has worn 20% with regards to the dimension Ws in the tire width direction of the road contact surface of the shoulder rib 41 of a new tire is set to be within a range such that $0.25 \leq Wb/Ws \leq 0.30$. Moreover, the dimension Wc in the tire width direction of the road contact surface of the sacrifice rib 42 when the groove depth of the circumferential main groove 3 has worn 40% with regards to the dimension Ws in the tire width direction of the road contact surface of the shoulder rib 41 of a new tire is set within a range such that $0.30 \leq Wc/Ws \leq 0.35$. Incidentally, the road contact surface of the sacrifice rib 42 is the surface of the sacrifice rib 42 that contacts with the road surface when a vehicle (not shown) to which the pneumatic tire for heavy load 1 is mounted is driven, and refers to the area from the opening edge of the circumferential fine groove 5 to the inflection point of the surface of the sacrifice rib 42 on the outer side in the tire width direction.

In other words, when the circumferential fine groove 5 is angled such that the opening side thereof is located on the inner side in the tire width direction when the tire is filled to a proper internal pressure and when the dimension Wa in the tire width direction of the road contact surface of the sacrifice rib 42 of a new tire, the dimension Wb in the tire width direction of the road contact surface of the sacrifice rib 42 when the groove depth of the circumferential main groove has worn 20%, and the dimension Wc in the tire width direction of the road contact surface of the sacrifice rib 42 when the groove depth of the circumferential main groove has worn 40% are specified with regards to the dimension Ws in the tire width direction of the road contact surface of the shoulder rib 41 of a new tire, the rigidity of the shoulder rib 41 can increased when worn from a new tire.

In this manner, the pneumatic tire for heavy load 1 of the present embodiment makes suppression of uneven wear of the shoulder rib 41 possible by being able to suppress the occurrence of uneven wear of the shoulder rib 41 in the early stages of wear as described above, and by being able to increase the rigidity of the shoulder rib of 41 during wear from a new tire.

Furthermore, with the pneumatic tire for heavy load 1 according to the present embodiment, a groove depth Db of the circumferential fine groove 5 is set with regards to a groove depth Da of the circumferential main grooves 3 such that $0.80 \leq Db/Da \leq 1.10$. Incidentally, the groove depth Da of the circumferential main grooves 3 and the groove depth Db of the circumferential fine groove 5 refer to the dimension from the center of the opening to the bottom of the groove. Furthermore, with the pneumatic tire for heavy load 1 according to the present embodiment, a groove width Wd of the circumferential fine groove 5 is set within a range such that $0.3 \text{ mm} \leq Wd \leq 2.0 \text{ mm}$.

With this construction, the effect of suppressing uneven wear of the shoulder rib 41 by the sacrifice rib 42 can be further enhanced.

Furthermore, as illustrated in FIG. 3, with the pneumatic tire for heavy load 1 of the present embodiment, the groove bottom of the circumferential fine groove 5 is formed with an inflection to the inner side in the tire width direction. Incidentally, an angle $\alpha$ of the groove bottom inflection is preferably set within a range such that $20° \leq \alpha$ with regards to the center line of the circumferential fine groove 5. Furthermore, the inflection of the groove bottom can be a bend or a curvature. When a curvature, the angle $\alpha$ is the angle formed by the straight line that connects the point of inflection from the center line of the circumferential fine groove 5 and the center of the groove bottom, and the center line of the circumferential fine groove 5.

With this construction, prevention of the occurrence of cracking in the groove bottom of the circumferential fine groove 5 is made possible since the rigidity of the groove bottom of the circumferential fine groove 5 is increased.

Furthermore, in the pneumatic tire for heavy load 1 of the present embodiment, with regards to the road contact surface of the tread 2 that contacts the road surface when the tire is filled to a proper internal pressure and a proper load is applied, the dimension TW in the tire width direction when the tread 2 is spread open, the dimension TWc in the tire width direction of the road contact surface of the rib 4 at the center in the tire width direction, the dimension TWs in the tire width direction of the road contact surface of the rib 4 (including the shoulder rib 41 and the sacrifice rib 42) on the outermost side in the tire width direction, the dimension TWh in the tire width direction of the road contact surface of the rib 4 between the rib 4 at the center in the tire width direction and the rib 4 on the outermost side in the tire width direction, and the groove width GW of all of the circumferential main grooves 3 satisfy $0.40 \leq TWs/(TW/2)$, $1.05 \leq TWs/TWh$, $1.05 \leq TWs/TWc$, and $0.15 \leq GW/TW \leq 0.20$. Incidentally, the dimension TW in the tire width direction when the tread 2 is spread open includes the groove width GW of the circumferential main grooves 3. Furthermore, the dimension TWs in the tire width direction of the road contact surface of the rib 4 on the outermost side in the tire width direction includes the groove width of the circumferential fine groove 5. Furthermore, when there are an even number of circumferential main grooves 3, the rib 4 at the center in the tire width direction will be formed by a single rib on the tire equatorial plane C, but when there are an odd number of circumferential main grooves 3, the rib 4 at the center in the tire width direction will be formed by two ribs that border the tire equatorial plane C. Therefore, when there are an odd number of circumferential main grooves 3, the rib 4 at the center in the tire width direction is defined as either rib that borders on the tire equatorial plane C. Furthermore, when there are 3 or less circumferential main grooves 3, the rib 4 between the rib 4 at the center in the tire width direction and the rib 4 on the outermost side in the tire width direction will not be formed, and therefore the rib 4 between the rib 4 at the center in the tire width direction and the rib 4 on the outermost side in the tire width direction is not defined. In addition, since a plurality of ribs 4 will be formed between the rib 4 at the center in the tire width direction and the rib 4 on the outermost side in the tire width direction when there are five or more circumferential main grooves 3, the rib 4 between the rib 4 at the center in the tire width direction and the rib 4 on the outermost side in the tire width direction is defined as any one of the plurality of ribs.

With this construction, when compared to a standard pneumatic tire for heavy load, the ratio of the groove width GW of all of the circumferential main grooves 3 to the dimension TW in the tire width direction when the tread 2 is spread opened decreases, and the ratio of the dimension TWs in the tire width direction of the road contact surface of the rib 4 on the outermost side in the tire width direction that is most subject to shear forces when a lateral force is generated in the tire width direction to the dimension TW in the tire width direction when the tread 2 is spread open, the dimension TWc in the tire width direction of the road contact surface of the rib 4 at the center in the rib width direction, and the dimension TWh in the tire width direction of the road contact surface of the rib 4 between the rib 4 at the center in the tire width direction and the rib 4 on the outermost side in the tire width direction increases. Therefore, the modulus of elasticity in the tire width direction of the entire tread 2 increases, and the amount of slippage in the shoulder region, which is the outermost side in the tire width direction, decreases. As a result, uneven wear due to slipping that occurs when lateral forces are generated in the tire width direction can be suppressed Furthermore, with the pneumatic tire for heavy load 1 according to the present embodiment, the dimension TWs in the tire width direction of the road contact surface of the rib 4 on the outermost side in the tire width direction is set with regards to the groove depth Db of the circumferential main groove 3 that forms the rib 4 on the outermost side in the tire width direction such that $2.00 \leq TWs/Db$.

With this construction, the modulus of elasticity in the tire width direction of the rib 4 on the outermost side in the tire width direction increases as compared to a standard pneumatic tire for heavy load. Therefore, the modulus of elasticity in the tire width direction of the entire tread 2 increases, and the amount of slippage in the shoulder region, which is the outermost side in the tire width direction, decreases. As a result, uneven wear due to slipping that occurs when lateral forces are generated in the tire width direction can be suppressed Furthermore, with the pneumatic tire for heavy load 1 of the present embodiment, the rubber of at least the rib 4 on the outermost side in the tire width direction has a JIS A hardness of 60 or higher in accordance with JIS K6253.

With this construction, the rubber hardness of the rib 4 on the outermost side in the tire width direction increases as compared to a standard pneumatic tire for heavy load. Therefore, the modulus of elasticity in the tire width direction of the entire tread 2 increases, and the amount of slippage in the shoulder region, which is the outermost side in the tire width direction, decreases. As a result, uneven wear due to slipping that occurs when lateral forces are generated in the tire width direction can be suppressed Embodiments FIG. 5 is a table indicating the results of performance testing of the pneumatic tire for heavy load according to an embodiment of the present invention. In this embodiment, performance tests for uneven wear resistance were performed on a plurality of types of pneumatic tires for heavy loads under various conditions.

For this performance testing, a pneumatic tire for heavy load with the tire size of 11R22.5 was assembled on a proper rim, filled to a proper internal pressure, and then mounted on the steering axle of a 2-D test vehicle in order to perform the test with a proper load applied. Herein, the terms proper rim and proper internal pressure are as defined above. A proper load includes "maximum load resistance" defined by JATMA, the maximum value in "tire load limits at various cold inflation pressures" defined by TRA, and "load capacity" defined by ETRTO.

The evaluation method was performed by driving a test vehicle to which pneumatic tires for heavy loads are mounted for 50,000 km on a paved road and then measuring the uneven wear (area×depth) that occurred in the shoulder rib after driving. The evaluation results were expressed as an index using the evaluation results of a conventional embodiment as 100, where the uneven wear resistance is superior as the index increases above 100.

In FIG. 5, although the pneumatic tire for heavy load of Conventional Embodiment 1 has a circumferential fine groove and the groove depth of the circumferential fine groove (Db/Da) has been optimized, the other dimensions have not been optimized. Additionally, although the pneumatic tire for heavy load of Comparative Embodiment 1 has a circumferential fine groove, and the amount of offset (H) of the sacrifice rib and the groove depth (Db/Da) of the circumferential fine groove have been optimized, the other dimensions have not been optimized. Although the pneumatic tire for heavy load of Comparative Embodiment 2 has a circumferential fine groove where the circumferential fine groove angle faces inward (facing the opening side), the sacrifice rib width (Wa/Ws) for a new tire is too large. Thus, the rigidity of the sacrifice rib is too high, and the ground contact pressure is increased, and therefore the uneven wear resistance is reduced.

On the other hand, the pneumatic tires for heavy loads of Embodiment 1 through Embodiment 4 have a circumferential fine groove and also, the amount of offset (H) of the sacrifice rib, the circumferential fine groove angle (facing the opening side), the sacrifice rib width (Wa/Ws) when a new tire, the sacrifice rib width (Wb/Ws) after 20% wearing of the circumferential main grooves, and the sacrifice rib width (Wc/Ws) after 40% wearing of the circumferential main grooves have been optimized. Furthermore, in Embodiment 2, in addition to Embodiment 1, the groove depth (Db/Da) of the circumferential fine groove and the groove width (Wd) of the circumferential fine groove have been optimized. Furthermore, in Embodiment 3 through Embodiment 6, the sacrifice rib widths (Wa/Ws, Wb/Ws, Wc/Ws), the groove depth (Db/Da) of the circumferential fine groove, and the rubber hardness have been optimized.

As shown by the test results of FIG. 5, the pneumatic tires for heavy loads of Embodiment 1 through Embodiment 6 were found to have increased uneven wear resistance.

INDUSTRIAL APPLICABILITY

As shown above, the pneumatic tire of the present invention is suitable for increasing uneven wear resistance.

BRIEF DESCRIPTION OF THE DRAWINGS

FIG. 1 is a meridian cross-sectional perspective view of a pneumatic tire for heavy load according to an embodiment of the present invention.

FIG. 2 is an expanded meridian cross-sectional view of the pneumatic tire for heavy load shown in FIG. 1.

FIG. 3 is a meridian cross-sectional view showing another form of the circumferential fine groove.

FIG. 4 is a meridian cross-sectional view of a pneumatic tire for heavy load according to an embodiment of the present invention.

FIG. 5 is a table showing the testing results for the performance tests on a pneumatic tire for heavy load according to an embodiment of the present invention.

EXPLANATIONS OF LETTERS OR NUMERALS

1 Pneumatic tire for heavy load
2 Tread
3 Circumferential main groove
4 Rib
41 Shoulder rib
42 Sacrifice rib
5 Circumferential fine groove
C tire equatorial plane
H Offset amount of sacrifice rib
Ws Dimension in the tire width direction of the road contact surface of the shoulder rib for a new tire
Wa Dimension in the tire width direction of the road contact surface of the sacrifice rib for a new tire
Wb Dimension in the tire width direction of the road contact surface of a sacrifice rib when the circumferential main groove has worn 20%
Wc Dimension in the tire width direction of the road contact surface of a sacrifice rib when the circumferential main groove has worn 40%
Wd Groove width of circumferential fine groove
Da Groove depth of circumferential main groove
Db Groove depth of circumferential fine groove
α Angle of inflection of groove bottom of circumferential fine groove
TW Dimension in the tire width direction with the tread spread open
TWc Dimension in the tire width direction of the road contact surface of the rib in the center in the tire width direction
TWs Dimension in the tire width direction of the road contact surface of the rib on the outermost side in the tire width direction
TWh Dimension in tire width direction of the road contact surface of rib between the rib in the center in the tire width direction and the rib on the outermost side in the tire width direction

What is claimed is:
1. A pneumatic tire for heavy load comprising:
at least three ribs extending in a circumferential direction of the tire, wherein the at least three ribs are separated from one another by means of at least two circumferential main grooves extending in the circumferential direction of the tire, the at least three ribs being formed in a tread;
a circumferential fine groove extending in the circumferential direction of the tire and opening to a tread road contact surface, the groove being formed in an outermost rib of the at least three ribs, the outermost rib being on an outermost side in the tire width direction among the at least three ribs;
a shoulder rib formed on an inner side in the tire width direction of the outermost rib; and
a sacrificial rib formed on an outer side in the tire width direction of the outermost rib, wherein:

a sacrificial rib road contact surface has an offset amount H of recess to an inner side in a radial direction of the tire with regards to a shoulder rib road contact surface that is set within a range such that 0 mm≦H≦0.5 mm;

the circumferential fine groove is angled such that an opening side thereof is located on the inner side in the tire width direction of the outermost rib when filled to a proper internal pressure; and a dimension Wa in the tire width direction of the sacrificial rib road contact surface of the tire is set with regards to a dimension Ws in the tire width direction of the shoulder rib road contact surface of the tire such that 0.10≦Wa/Ws ≦0.20;

a dimension Wb in the tire width direction of the road contact surface of the sacrificial rib when the groove depth of the circumferential main grooves has worn 20% with regards to the dimension Ws in the tire width direction of the shoulder rib road contact surface is set in a range such that 0.25≦Wb/Ws ≦0.30;

a dimension Wc in the tire width direction of the sacrificial rib road contact surface when a groove depth of the circumferential main grooves has worn 40% with regards to the dimension Ws in the tire width direction of the shoulder rib road contact surface is set in a range such that 0.30≦Wc/Ws ≦0.35; and with regards to the tread road contact surface that contacts the road surface when filled to the proper internal pressure and a proper load is applied, a dimension TW in the tire width direction when the tread is spread open, a dimension TWc in the tire width direction of the road contact surface of a center rib at a center in the tire width direction, a dimension TWs in the tire width direction of the road contact surface of the outermost rib, a dimension TWh in the tire width direction of the road contact surface of the rib between a tire center in the tire width direction and a tire outermost side in the tire width direction, and a groove width GW of all of the circumferential main grooves satisfy 0.40≦TWs/(TW/2), 1.05≦TWs/TWh, 1.05≦TWs/TWc, and 0.15≦GW/TW ≦0.20.

2. The pneumatic tire for heavy load according to claim 1, wherein a groove depth Db of the circumferential fine groove is set with regards to a groove depth Da of the circumferential main grooves such that 0.80≦Db/Da ≦1.10, and a groove width Wd of the circumferential fine groove is set within a range such that 0.3 mm≦Wd≦2.0 mm.

3. The pneumatic tire for heavy load according to claim 2, wherein a groove bottom of the circumferential fine groove is formed with an inflection to the inner side of the groove bottom in the width direction of the tire, wherein the inflection comprises a curvature in the fine groove and the fine groove continues in a line after the curvature.

4. The pneumatic tire for heavy load according to claim 2, wherein the dimension TWs in the tire width direction of an outermost rib road contact surface is set with regards to the groove depth Db of the circumferential main groove that forms the outermost rib-such that 2.00≦TWs/Db.

5. The pneumatic tire for heavy load according to claim 4, wherein a rubber of at least the outermost rib has a Japanese Industrial Standard A hardness of 60 or more.

6. The pneumatic tire for heavy load according to claim 1, wherein a groove bottom of the circumferential fine groove is formed with an inflection to the inner side of the groove bottom in the width direction of the tire, wherein the inflection comprises a curvature in the fine groove and the fine groove continues in a line after the curvature.

7. The pneumatic tire for heavy load according to claim 1, wherein the dimension TWs in the tire width direction of an outermost rib road contact surface is set with regards to the groove depth Db of the circumferential main groove that forms the outermost side in the width direction of the tire such that 2.00≦TWs/Db.

8. The pneumatic tire for heavy load according to claim 1, wherein a rubber of at least the outermost rib has a Japanese Industrial Standard A hardness of 60 or more, and wherein a groove bottom of the circumferential fine groove is formed with an inflection to the inner side of the groove bottom in the width direction of the tire.

9. A pneumatic tire for heavy load comprising:

at least three ribs extending in a circumferential direction of the tire, wherein the at least three ribs are separated from one another by means of at least two circumferential main grooves extending in the circumferential direction of the tire, the at least three ribs being formed in a tread;

a circumferential fine groove extending in the circumferential direction of the tire and opening to a tread road contact surface, the groove being formed in an outermost rib of the at least three ribs, the outermost rib being on an outermost side in the tire width direction among the at least three ribs and being formed from a rubber having a Japanese Industrial Standard A hardness of at least 60;

a shoulder rib formed on an inner side in the tire width direction of the outermost rib; and a sacrificial rib formed on an outer side in the tire width direction of the outermost rib, wherein:

a sacrificial rib road contact surface has an offset amount H of recess to an inner side in a radial direction of the tire with regards to a shoulder rib road contact surface that is set within a range such that 0 mm≦H≦0.5 mm;

the circumferential fine groove is angled such that an opening side thereof is located on the inner side in the tire width direction of the outermost rib when filled to a proper internal pressure; and a dimension Wa in the tire width direction of the sacrificial rib road contact surface of the tire is set with regards to a dimension Ws in the tire width direction of the shoulder rib road contact surface of the tire such that 0.10≦Wa/Ws≦0.20;

a dimension Wb in the tire width direction of the road contact surface of the sacrificial rib when the groove depth of the circumferential main grooves has worn 20% with regards to the dimension Ws in the tire width direction of the shoulder rib road contact surface is set in a range such that 0.25≦Wb/Ws≦0.30;

a dimension Wc in the tire width direction of the sacrificial rib road contact surface when a groove depth of the circumferential main grooves has worn 40% with regards to the dimension Ws in the tire width direction of the shoulder rib road contact surface is set in a range such that 0.30≦Wc/Ws≦0.35; and with regards to the tread road contact surface that contacts the road surface when filled to the proper internal pressure and a proper load is applied, a dimension TW in the tire width direction when the tread is spread open, a dimension TWc in the tire width direction of the road contact surface of a center rib at a center in the tire width direction, a dimension TWs in the tire width direction of the road contact surface of the outermost rib, a dimension TWh in the tire width direction of the road contact surface of the rib between a tire center in the tire width direction and a tire outermost side in the tire width direction, and a groove width GW of all of the circumferential main grooves satisfy $0.40 \leq TWs/(TW/2)$, $1.05 \leq TWs/TWh$, $1.05 \leq TWs/TWc$, and $0.15 \leq GW/TW \leq 0.20$.

10. The pneumatic tire for heavy load according to claim 9, wherein a groove bottom of the circumferential fine groove is formed with an inflection to the inner side of the groove bottom in the width direction of the tire, wherein the inflection comprises a curvature in the fine groove and the fine groove continues in a line after the curvature.

11. The pneumatic tire for heavy load according to claim 10, wherein the curvature has an angle α formed by a straight line that connects the inflection from a center line of the circumferential fine groove and the center of the groove bottom with a center line of the circumferential fine groove.

12. The pneumatic tire for heavy load according to claim 11, wherein the dimension TWs in the tire width direction of an outermost rib road contact surface is set with regards to the groove depth Db of the circumferential main groove that forms the outermost such that $2.00 \leq TWs/Db$.

13. A pneumatic tire for heavy load comprising:
at least three ribs extending in a circumferential direction of the tire, wherein the at least three ribs are separated from one another by means of at least two circumferential main grooves extending in the circumferential direction of the tire, the at least three ribs being formed in a tread;
a circumferential fine groove extending in the circumferential direction of the tire and opening to a tread road contact surface, the groove being formed in an outermost rib of the at least three ribs, the outermost rib being on an outermost side in the tire width direction among the at least three ribs, and wherein a groove bottom of the circumferential fine groove is formed with an inflection to the inner side of the groove bottom in the width direction of the tire, the inflection having an inflection angle of at least 20°;
a shoulder rib formed on an inner side in the tire width direction of the outermost rib; and
a sacrificial rib formed on an outer side in the tire width direction of the outermost rib, wherein:
a sacrificial rib road contact surface has an offset amount H of recess to an inner side in a radial direction of the tire with regards to a shoulder rib road contact surface that is set within a range such that $0 \text{ mm} \leq H \leq 0.5 \text{ mm}$;
the circumferential fine groove is angled such that an opening side thereof is located on the inner side in the tire width direction of the outermost rib when filled to a proper internal pressure;
a dimension Wa in the tire width direction of the sacrificial rib road contact surface of the tire is set with regards to a dimension Ws in the tire width direction of the shoulder rib road contact surface of the tire such that $0.10 \leq Wa/Ws \leq 0.20$;
a dimension Wb in the tire width direction of the road contact surface of the sacrificial rib when the groove depth of the circumferential main grooves has worn 20% with regards to the dimension Ws in the tire width direction of the shoulder rib road contact surface is set in a range such that $0.25 \leq Wb/Ws \leq 0.30$;
a dimension Wc in the tire width direction of the sacrificial rib road contact surface when a groove depth of the circumferential main grooves has worn 40% with regards to the dimension Ws in the tire width direction of the shoulder rib road contact surface is set in a range such that $0.30 \leq Wc/Ws \leq 0.35$; and
with regards to the tread road contact surface that contacts the road surface when filled to the proper internal pressure and a proper load is applied, a dimension TW in the tire width direction when the tread is spread open, a dimension TWc in the tire width direction of the road contact surface of a center rib at a center in the tire width direction, a dimension TWs in the tire width direction of the road contact surface of the outermost rib, a dimension TWh in the tire width direction of the road contact surface of the rib between a tire center in the tire width direction and a tire outermost side in the tire width direction, and a groove width GW of all of the circumferential main grooves satisfy $0.40 \leq TWs/(TW/2)$, $1.05 \leq TWs/TWh$, $1.05 \leq TWs/TWc$, and $0.15 \leq GW/TW \leq 0.20$.

14. The pneumatic tire for heavy load according to claim 13, wherein the dimension TWs in the tire width direction of an outermost rib road contact surface is set with regards to the groove depth Db of the circumferential main groove that forms the outermost such that $2.00 \leq TWs/Db$.

15. The pneumatic tire for heavy load according to claim 13, wherein a rubber of at least the outermost rib has a Japanese Industrial Standard A hardness of 60 or more.

16. The pneumatic tire for heavy load according to claim 13, wherein a groove depth Db of the circumferential fine groove is set with regards to a groove depth Da of the circumferential main grooves such that $0.80 \leq Db/Da \leq 1.10$, and a groove width Wd of the circumferential fine groove is set within a range such that $0.3 \text{ mm} \leq Wd \leq 2.0 \text{ mm}$.

* * * * *